United States Patent
Shirosaki et al.

[19]

[11] Patent Number: 6,152,606
[45] Date of Patent: Nov. 28, 2000

[54] SELF-ALIGNING ROLLER BEARING

[75] Inventors: Yoshihiko Shirosaki; Yukio Sato, both of Kanagawa, Japan

[73] Assignee: NSK Ltd., Tokyo, Japan

[21] Appl. No.: 09/062,558

[22] Filed: Apr. 20, 1998

[30] Foreign Application Priority Data

Apr. 18, 1997 [JP] Japan .................................... 9-115109
Mar. 10, 1998 [JP] Japan .................................... 10-75095

[51] Int. Cl.[7] .................................................. F16C 43/04
[52] U.S. Cl. ............................................ 384/558; 384/475
[58] Field of Search .................................... 384/470, 474, 384/475, 558, 551, 572

[56] References Cited

U.S. PATENT DOCUMENTS

| | | | |
|---|---|---|---|
| 1,096,530 | 5/1914 | Hess | 384/572 |
| 3,195,965 | 7/1965 | Van Dorn | 384/572 |
| 3,981,550 | 9/1976 | Zimmer et al. | 384/558 |
| 4,575,265 | 3/1986 | Tooley | 384/474 |
| 5,413,416 | 5/1995 | Grunze et al. | 384/572 |

*Primary Examiner*—David A. Bucci
*Assistant Examiner*—Brandon C. Stallman
*Attorney, Agent, or Firm*—Sughrue, Mion, Zinn, Macpeak & Seas, PLLC

[57] ABSTRACT

Circumferential grooves 6c and 6d are respectively formed in the outer peripheral surface 6a and inner peripheral surface 6b of a floating ring 6, and the circumferential groove 6d is used to form a lubricant feed portion 8 in a clearance 7 between the outer peripheral surface 1a of an inner race 1 and itself, while the circumferential groove 6c is used to form another lubricant feed portion 8 in another clearance 7 between the inner peripheral surface 5b of a cage 5 and itself, thereby being able to improve lubricating conditions between the two respective partner portions.

4 Claims, 15 Drawing Sheets

RELATIONSHIP BETWEEN A LUBRICATION OIL PRESSURE
AND A LUBRICATION OIL QUANTITY

⸻◆⸻ WITH FLOATING RING GROOVE

⸻■⸻ WITHOUT FLOATING RING GROOVE (PRIOR ART)

SELF-ALIGNING ROLLER BEARING

BACKGROUND OF THE INVENTION

The present invention relates to an improved self-aligning roller bearing in which lubricant is infused into one or more of sliding surfaces respectively existing between an outer race and a floating ring, between a cage and a floating ring, between a floating ring and an inner race, between a cage and an outer race to thereby be able to improve the lubricating condition of the self-aligning roller bearing.

Conventionally, as a self-aligning roller bearing, there are known several types of self-aligning roller bearings: for example, a self-aligning roller bearing shown in FIGS. 1 and 2 structured such that, when it is used, an inner race 100 thereof can be rotated, and a floating ring 600 thereof is mounted on the outer peripheral surface 103 of the inner race 100; a self-aligning roller bearing shown in FIGS. 5 and 7 structured such that a floating ring 600 or a cage 500 thereof is mounted in the central portion of the raceway surface 204 of an outer race 200 thereof; and, a self-aligning roller bearing shown in FIGS. 3 and 4 structured such that, when it is used, an outer race 200 thereof can be rotated, a floating ring 600 thereof is mounted on the outer peripheral surface 103 of an inner race 100 thereof. By the way, in these figures, reference characters 300 and 400 respectively designate rollers.

In the self-aligning roller bearing shown in FIGS. 1 and 2, the floating ring 600 is mounted on the outer peripheral surface 103 of the inner race 100 with a very small clearance 700 between them, and the respective parts of the present roller bearing are lubricated by lubricant or lubrication oil which is supplied to the present roller bearing.

In the self-aligning roller bearing shown in FIGS. 3 and 4, a circumferential groove (lubrication oil groove) 102 is formed in the central portion of the inner peripheral surface 104 of the inner race 100, the inner race 100 is formed in such a manner that it includes a plurality of through holes (lubrication oil holes) 101 respectively formed on the circumference thereof for communicating the circumferential groove 102 with an outer peripheral surface 103, and the floating ring 600 is mounted on the outer peripheral surface 103 of the inner race 100 with a very small clearance 700 between them. Therefore, lubricant or lubrication oil, which is supplied to the bearing from a shaft, is passed through the circumferential groove (lubrication oil groove) 102 formed in the inner peripheral surface 104 of the inner race 100 as well as through the through holes (lubrication oil holes) 101, and is injected through the small clearance 700 between the inner peripheral surface 602 of the floating ring 600 and the outer peripheral surface 103 of the inner race to thereby lubricate the respective parts of the present roller bearing.

In the self-aligning roller bearing shown in FIG. 5, the outer race 200 includes a circumferential groove (lubrication oil groove) 202 formed in the central portion of the outer peripheral surface 203 thereof, and also a plurality of through holes (lubrication oil holes) 201 which are respectively formed in the circumference thereof for communicating the circumferential groove (lubrication oil groove) 202 with the raceway surface 204; and, the floating ring 600 is mounted in the central portion of the raceway surface 204 of the outer race 200 with a very small clearance 700 therebetween, while the floating ring 600 includes two flat portions 603 and 603 which, as shown in FIG. 6, are respectively disposed in the two mutually opposing positions of the circumference of the floating ring 600. Due to this structure, lubricant or lubrication oil, which is supplied to the circumferential groove 202 (lubrication oil groove) formed in the outer race outer peripheral surface 203, is passed through the through holes (lubrication oil holes) 201 and is injected through the clearance 700 between the outer race raceway surface 204 and the floating ring outer peripheral surface 601 to thereby lubricate the respective parts of the present roller bearing.

In the self-aligning roller bearing shown in FIG. 7, the outer race 200 includes a circumferential groove (lubrication oil groove) 202 formed in the central portion of the outer peripheral surface 203 thereof as well as a plurality of through holes (lubrication oil holes) 201 for communicating the circumferential groove (lubrication oil groove) 202 with the outer race raceway surface 204; and, the cage 500 is mounted on the central portion of the raceway surface 204 of the outer race 200 with a very small clearance 700 between them. In this structure, lubricant or lubrication oil supplied to the circumferential groove (oil groove) 202 in the outer race outer peripheral surface 203 is firstly passed through the through holes (lubrication oil holes) 201 and is then injected through the clearance 700 between the outer race raceway surface 204 and the cage outer peripheral surface 501, thereby lubricating the respective parts of the present roller bearing.

However, in the conventional structure shown in FIG. 1, since the clearance 700 between the floating ring outer peripheral surface 601 and the cage inner peripheral surface 502 as well as the clearance 700 between the inner race outer peripheral surface 103 and the floating ring inner peripheral surface 602 are small, the lubricant is difficult to advance into these clearances 700, so that the sliding surfaces can be easily damaged, for example, they can be easily scraped due to lack of lubrication.

In addition, in the conventional structure shown in FIG. 3, the floating ring 600 is structured such that it spreads over the inner race through holes (lubrication oil holes) 101, and the clearance 700 between the inner race outer peripheral surface 103 and the floating ring inner peripheral surface 602 is small, which provides a large resistance to the passage of the lubricant. For this reason, the lubricant, which is supplied from the shaft through the inner race 100, is not allowed to turn in the circumferential direction so that, as shown in FIG. 4, the lubricant can be injected only through the clearance 700 located in the neighborhood of the through holes (lubrication oil holes) 101 formed in the inner race 100.

Therefore, a required amount of lubricant cannot be supplied into the bearing under a normal oil pressure, with the result that the temperature of the present roller bearing becomes excessively high and the present roller bearing can be damaged, for example, can be scraped and so on due to lack of the lubrication oil quantity.

Similarly, in the conventional structure shown in FIGS. 5 and 7, because the floating ring 600 and cage 500 are so structured as to spread over the through holes (lubrication oil holes) 201 in the outer race 200 and also the clearance 700 between the outer race raceway surface 204 and floating ring outer peripheral surface 601 or cage outer peripheral surface 501 is small, there arises a problem to be solved due to lack of lubrication.

SUMMARY OF THE INVENTION

The present invention aims at eliminating the drawbacks found in the above-mentioned conventional self-aligning roller bearings. Accordingly, it is an object of the invention to provide an improved self-aligning roller bearing in which a lubricant feed portion is provided in a small clearance in the circumferential direction of the sliding surface thereof so as to be able to supply a sufficient amount of lubricant, thereby being able to prevent the temperature of the roller bearing from rising and also to prevent the roller bearing against damage such as scraping and the like.

In attaining the above object, according to the invention, there is provided a self-aligning roller bearing comprising an inner race, an outer race, a roller, and one or both of a cage and a floating ring, in which, in one or more of clearances respectively existing between the cage and floating ring, between the floating ring and inner race, between the floating ring and outer race, and between the cage and outer race, there is (are) recessedly formed a lubricant or lubrication oil feed portion (lubricant feed portions) which is (are) used to feed the lubricant in the circumferential direction of one or more of the above-mentioned clearances respectively existing between the above-mentioned respective components of the present roller bearing.

The above-mentioned object can also be attained by a self-aligning roller bearing including an inner race, an outer race, a roller, and at least one of a cage and a floating ring, wherein, said self-aligning roller bearing comprises at least one of a first clearance between said cage and said floating ring;

a second clearance between said floating ring and said inner race;

a third clearance between said floating ring and said outer ring; and a fourth clearance between the cage and the outer ring;

wherein at least one lubricant feed portion, in the form of a recess-shape, for feeding lubricant in the circumferential direction of the bearing is provided at the at least one of the first to fourth clearance.

In the above-mentioned construction according to the present invention, advantageously, the at least one lubricant feed portion is shaped in the form of a circumferential groove.

In addition, in the above-mentioned construction according to the present invention, advantageously, at least one of the inner race, the outer race, a roller, the cage and the floating ring comprises a through hole extending in the radial directions thereof and communicating with the at least one of the first to fourth clearance.

DETAILED DESCRIPTION OF THE PREFERRED EMBODIMENTS

Figure 10:
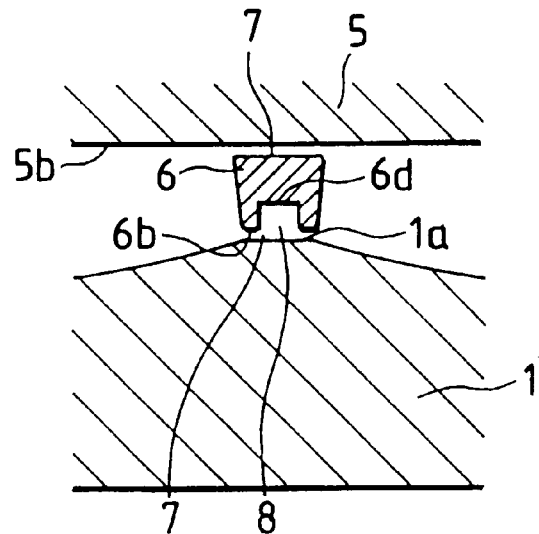
FIG. 10 is an enlarged section view of the main portions of a second embodiment of a self-aligning roller bearing according to the invention.
Figure 11:
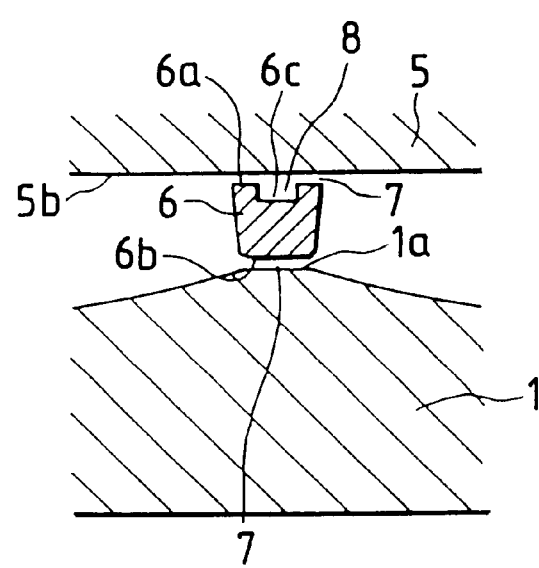
FIG. 11 is an enlarged section view of the main portions of a third embodiment of a self-aligning roller bearing according to the invention.
Figure 12:
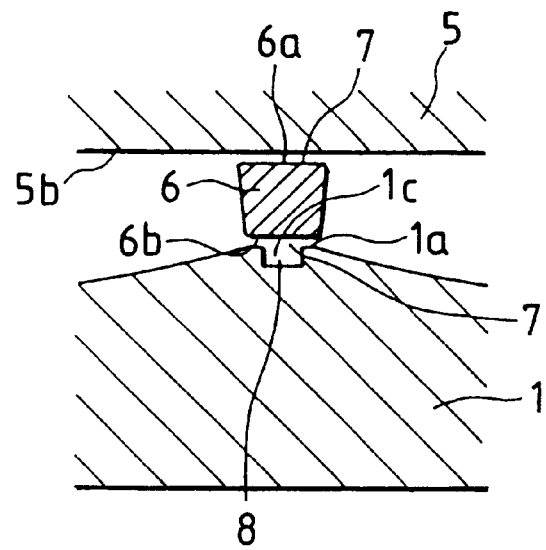
FIG. 12 is an enlarged section view of the main portions of a fourth embodiment of a self-aligning roller bearing according to the invention.
Figure 13:
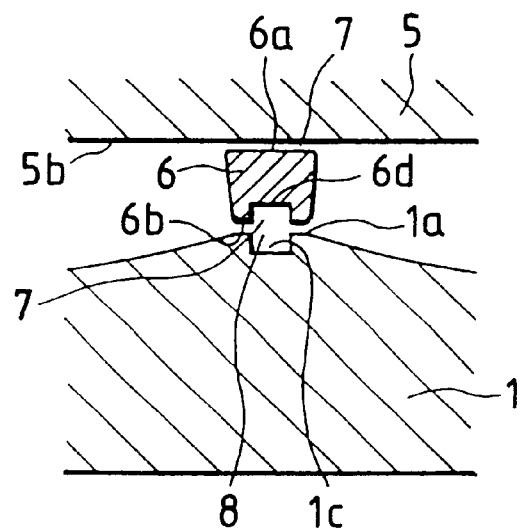
FIG. 13 is an enlarged section view of the main portions of a fifth embodiment of a self-aligning roller bearing according to the invention.
Figure 14:
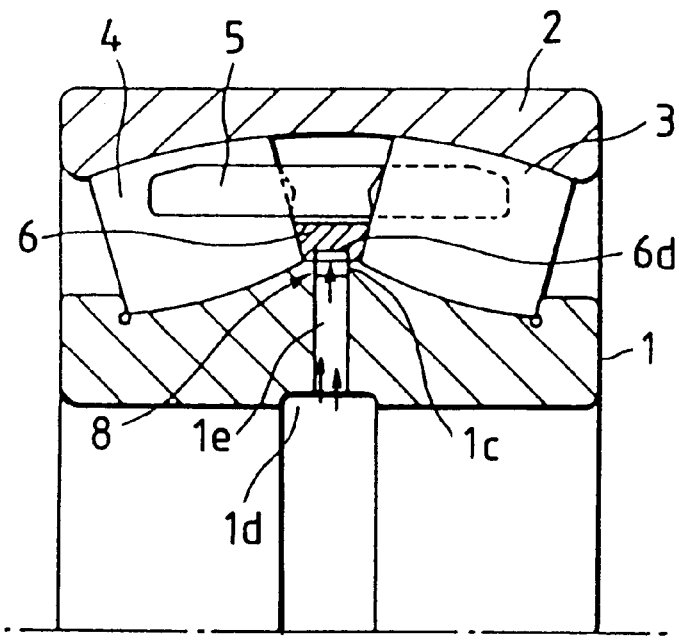
FIG. 14 is a longitudinal section view of a sixth embodiment of a self-aligning roller bearing according to the invention, which is used in such a manner that an outer race thereof is rotatable.
Figure 15:
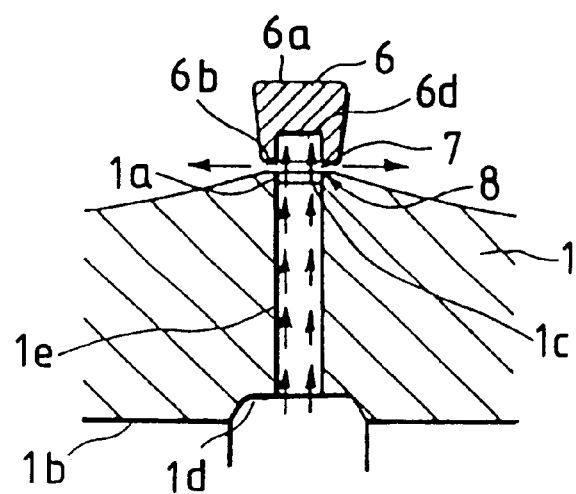
FIG. 15 is an enlarged section view of the main portions of the embodiment shown in FIG. 14.
Figure 16:
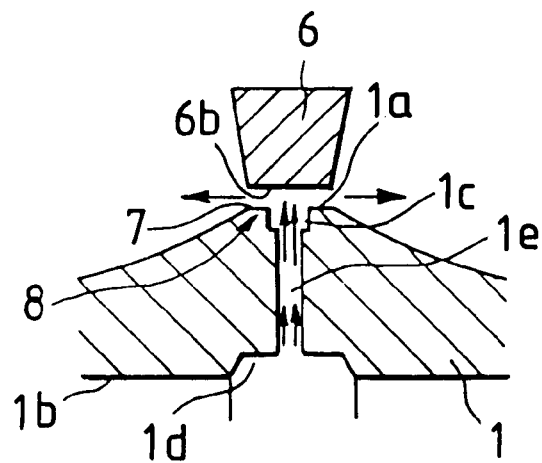
FIG. 16 is an enlarged section view of a seventh embodiment of a self-aligning roller bearing according to the invention, which is used in such a manner that an outer race thereof is rotatable.
Figure 17:
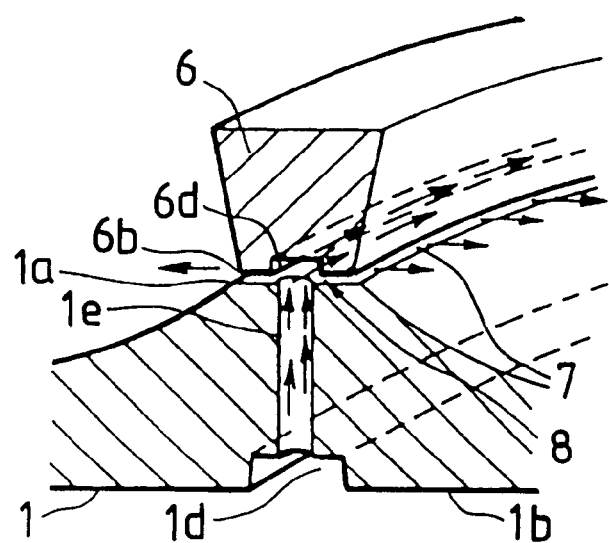
FIG. 17 is an enlarged section view of an eighth embodiment of a self-aligning roller bearing according to the invention, which is used in such a manner that an outer race thereof is rotatable.
Figure 18:
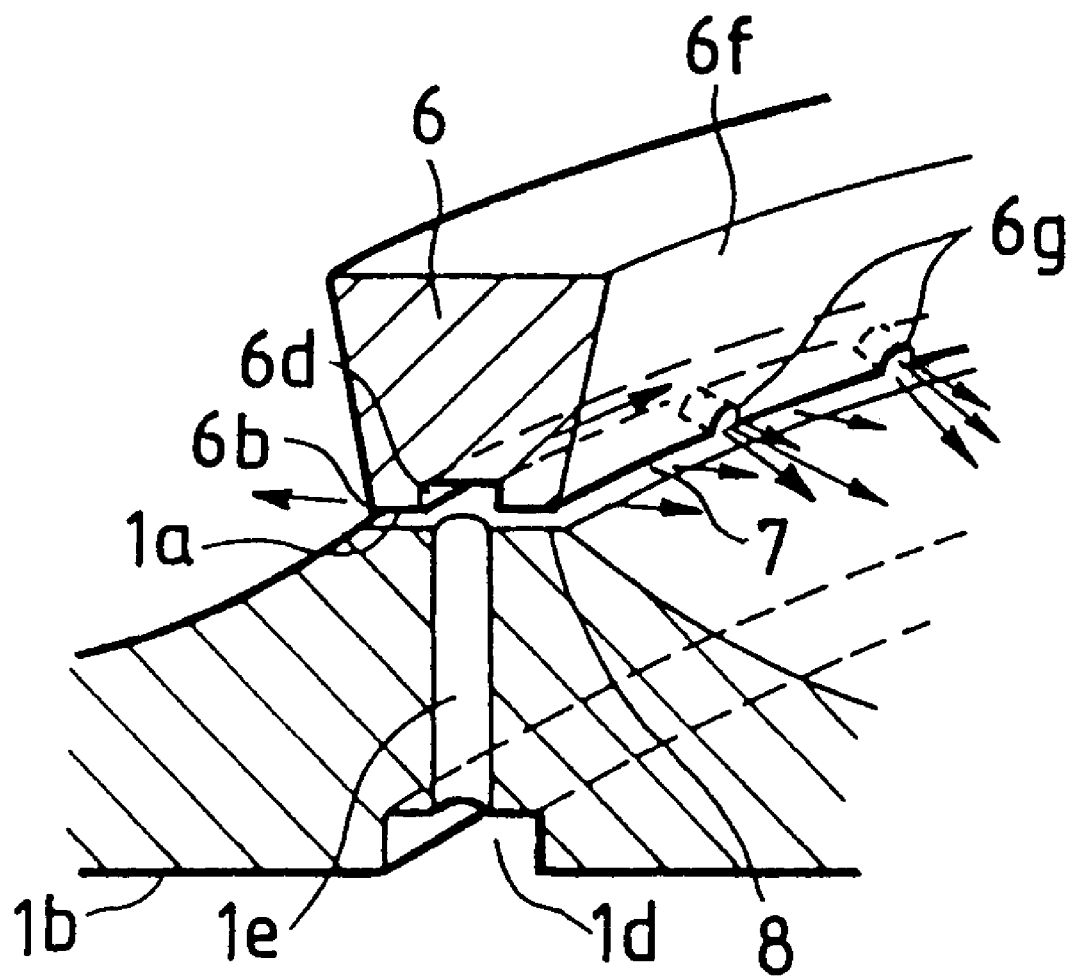
FIG. 18 is an enlarged section view of a ninth embodiment of a self-aligning roller bearing according to the invention, which is used in such a manner that an outer race thereof is rotatable.
Figure 20:
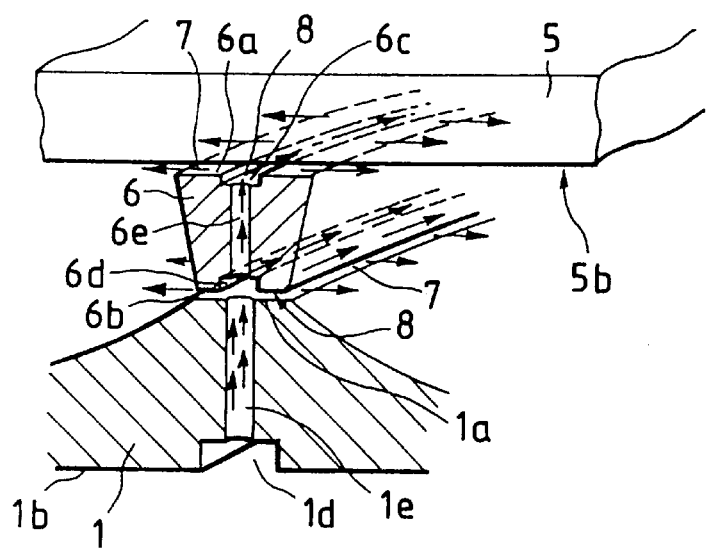
FIG. 20 is an enlarged section view of a tenth embodiment of a self-aligning roller bearing according to the invention, which is used in such a manner that an outer race thereof is rotatable.
Figure 21:
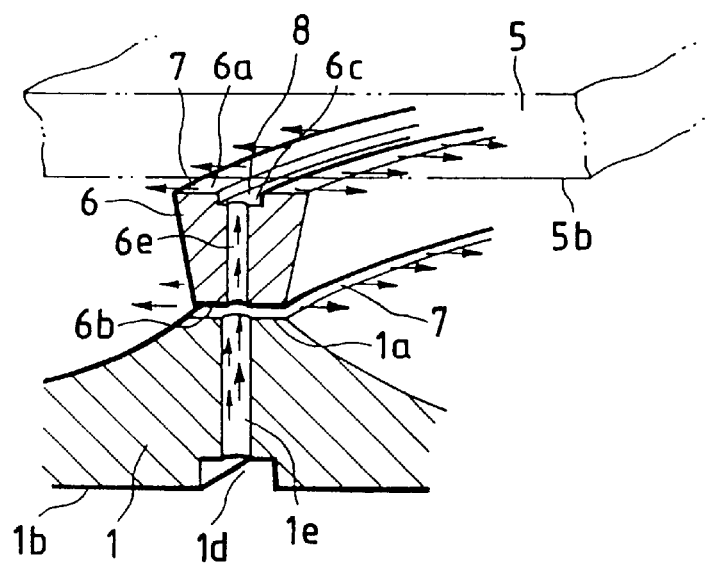
FIG. 21 is an enlarged section view of an eleventh embodiment of a self-aligning roller bearing according to the invention, which is used in such a manner that an outer race thereof is rotatable.
Figure 22:
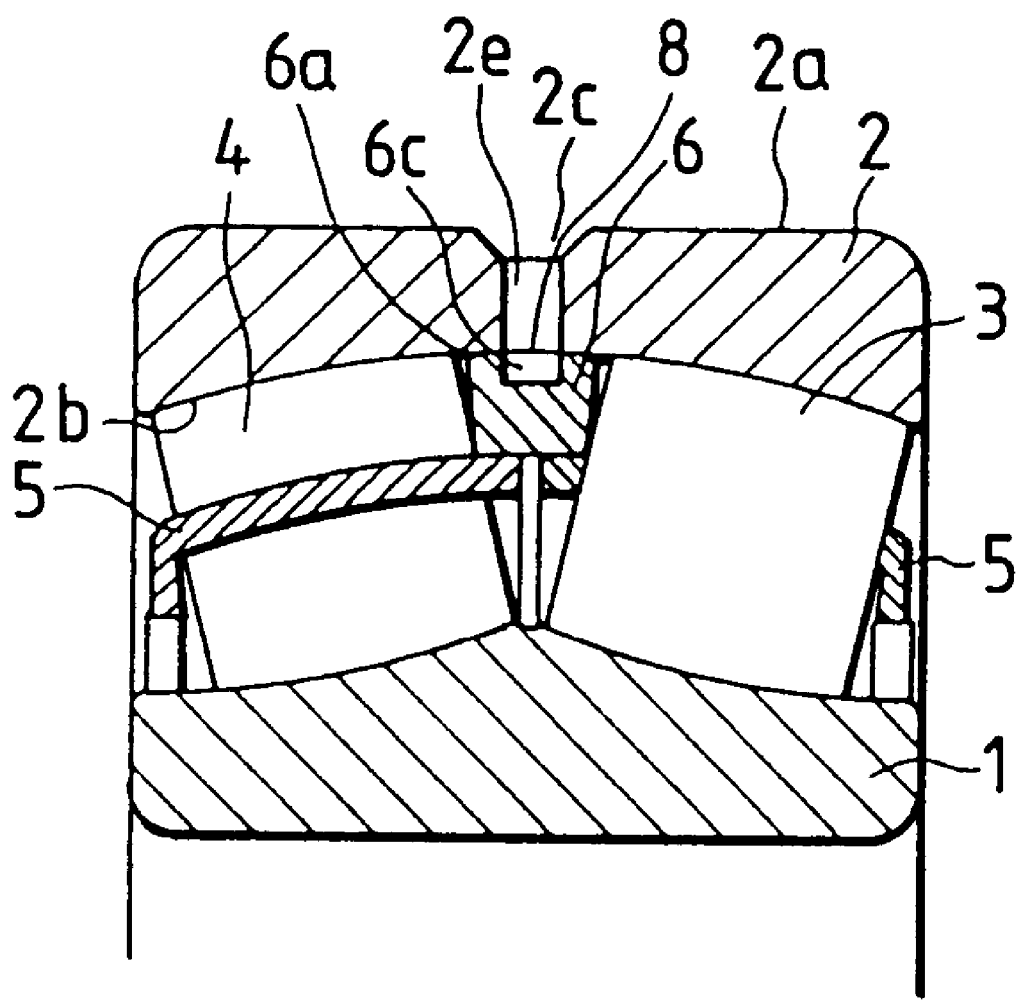
FIG. 22 is a longitudinal section view of a twelfth embodiment of a self-aligning roller bearing according to the invention, in which lubricant is supplied from an outer race thereof.
Figure 24:
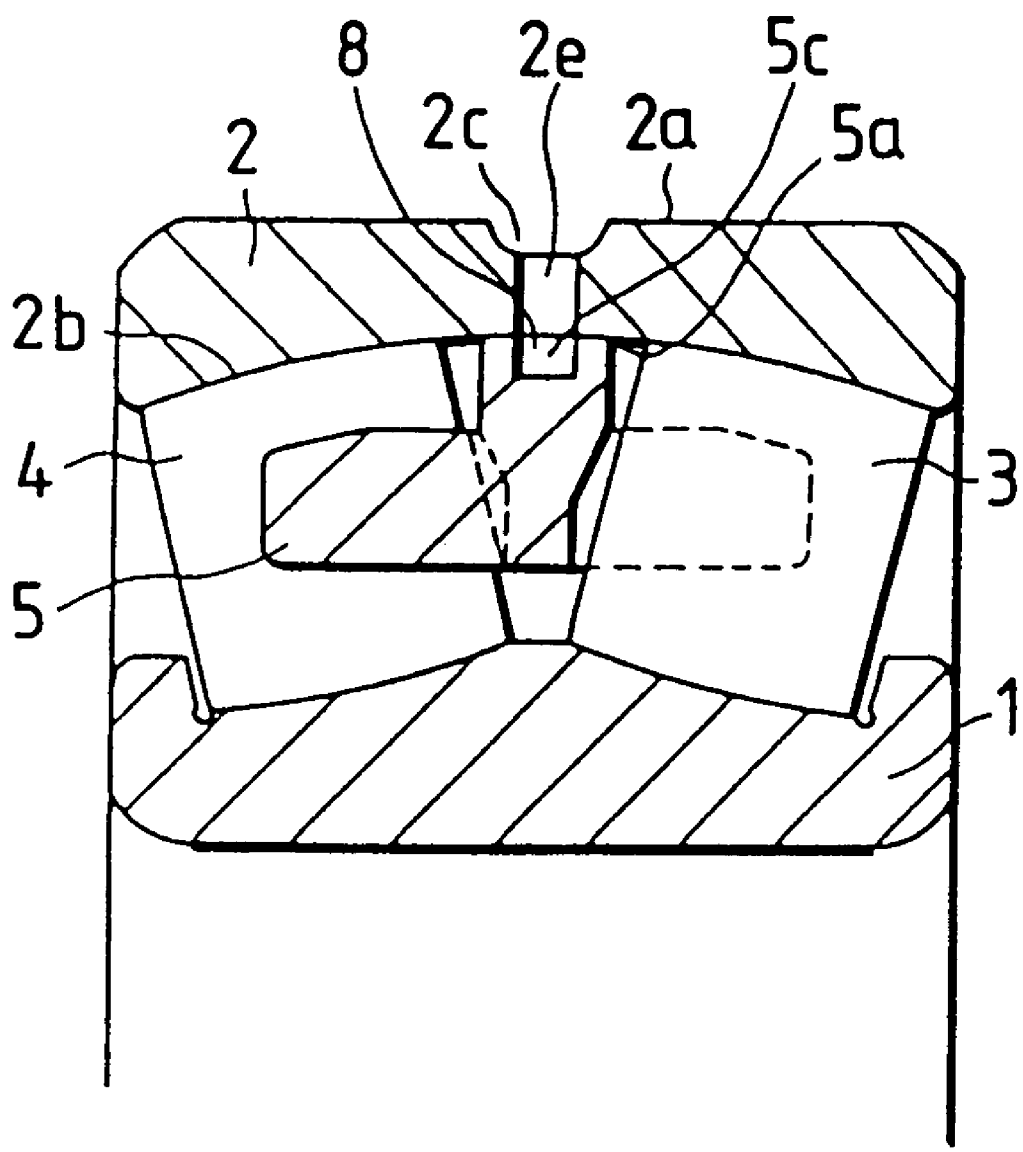
FIG. 24 is a longitudinal section view of a thirteenth embodiment of a self-aligning roller bearing according to the invention, in which lubricant is supplied from an outer race thereof.

Hereinafter, description will be given below in detail of the embodiments of a self-aligning roller bearing according to the invention with reference to the accompanying drawings. In particular, FIGS. 8 and 9 show a first embodiment of a self-aligning roller bearing according to the invention, FIG. 10 shows a second embodiment thereof, FIG. 11 shows a third embodiment thereof, FIG. 12 shows a fourth embodiment thereof, FIG. 13 shows a fifth embodiment thereof, FIGS. 14 and 15 show a sixth embodiment thereof, FIG. 16 shows a seventh embodiment thereof, FIG. 17 shows an eighth embodiment thereof, FIG. 18 shows a ninth embodiment thereof, FIG. 20 shows a tenth embodiment thereof, FIG. 21 shows an eleventh embodiment thereof, FIG. 22 shows a twelfth embodiment thereof, and FIG. 24 shows a thirteenth embodiment thereof.

By the way, the above-mentioned respective embodiments of the invention are only examples of a self-aligning roller bearing according to the invention. Therefore, the present invention is not limited to the illustrated embodiments at all but other embodiments can also be selected arbitrarily without departing from the scope and spirit of the invention.

Figure 1:
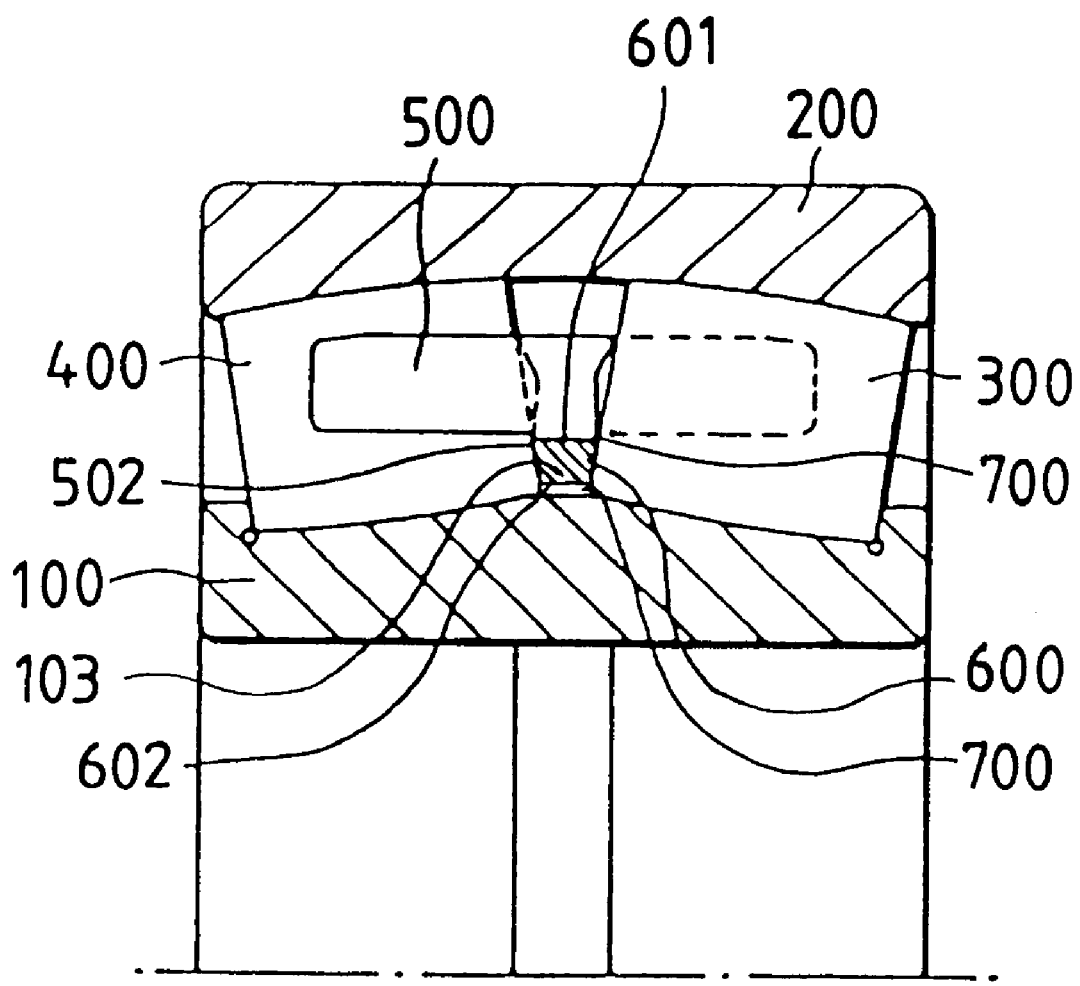
FIG. 1 is a longitudinal section view of a first example of a conventional self-aligning roller bearing.
Figure 2:
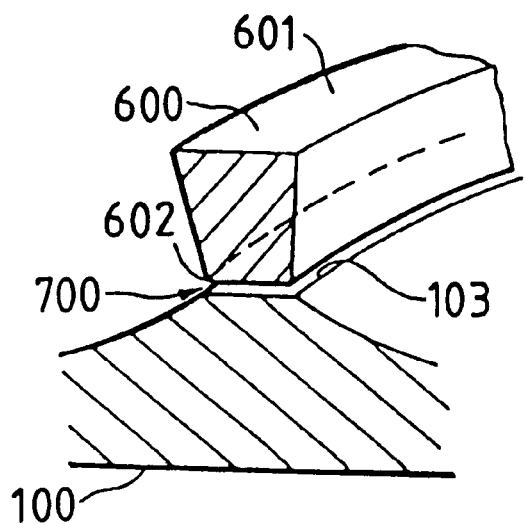
FIG. 2 is an enlarged section view of the main portions of the example of the conventional self-aligning roller bearing sown in FIG. 18.
Figure 3:
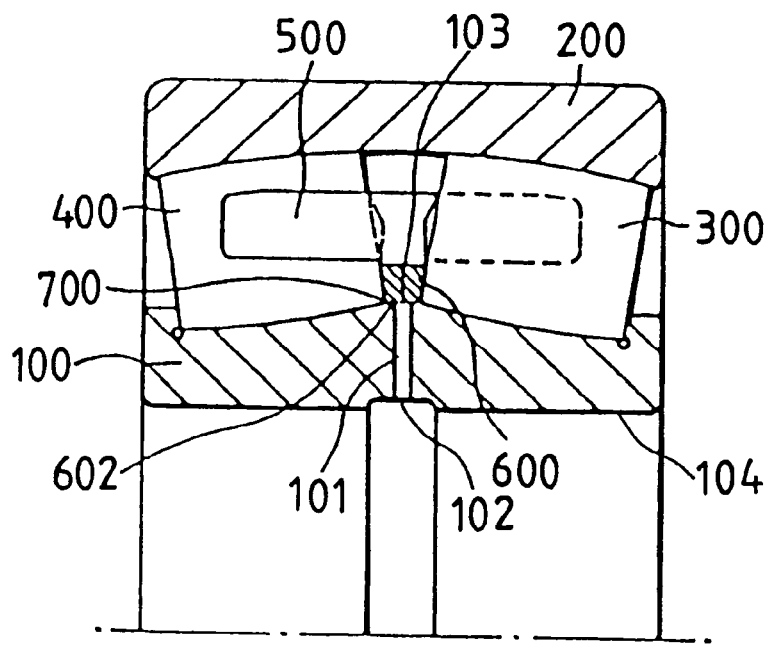
FIG. 3 is a longitudinal section view of a second example of the conventional self-aligning roller bearing.
Figure 4:
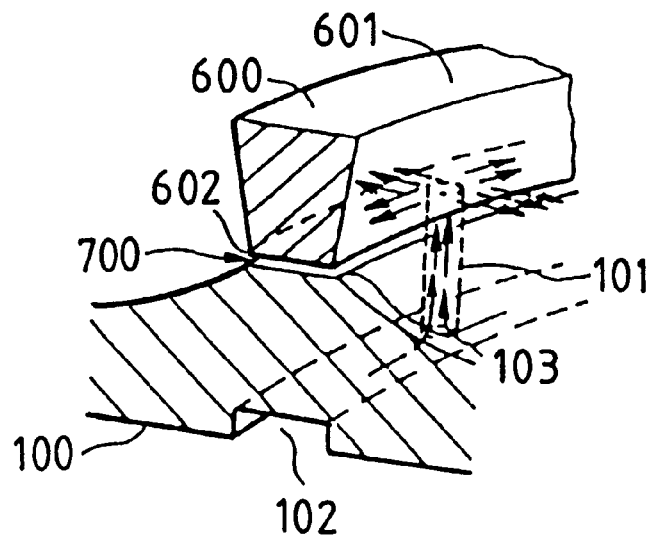
FIG. 4 is an enlarged section view of the main portions of the example of the conventional self-aligning roller bearing shown in FIG. 3.
Figure 5:
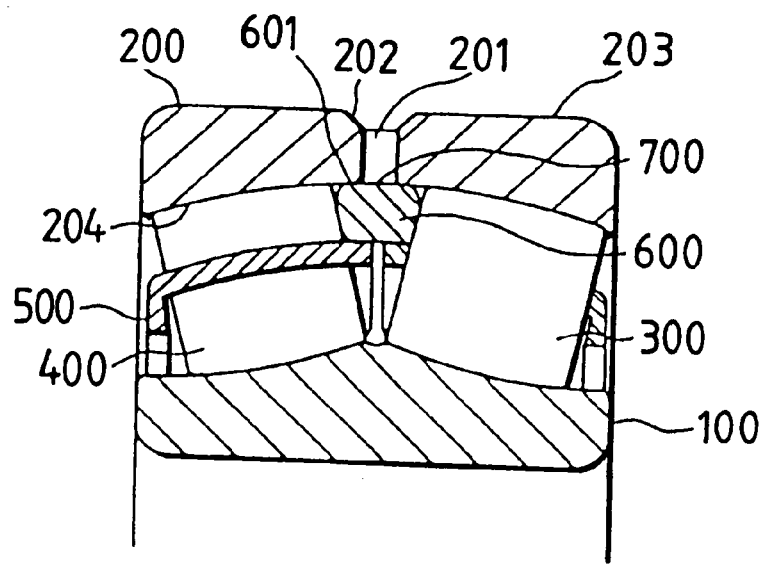
FIG. 5 is a longitudinal section view of a third example of the conventional self-aligning roller bearing.
Figure 6:
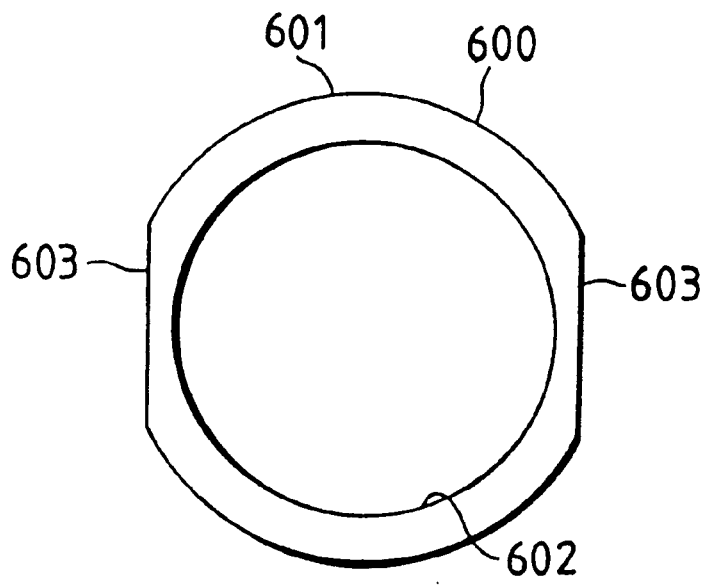
FIG. 6 is a side view of an example of a floating ring forms the conventional self-aligning roller bearing.
Figure 7:
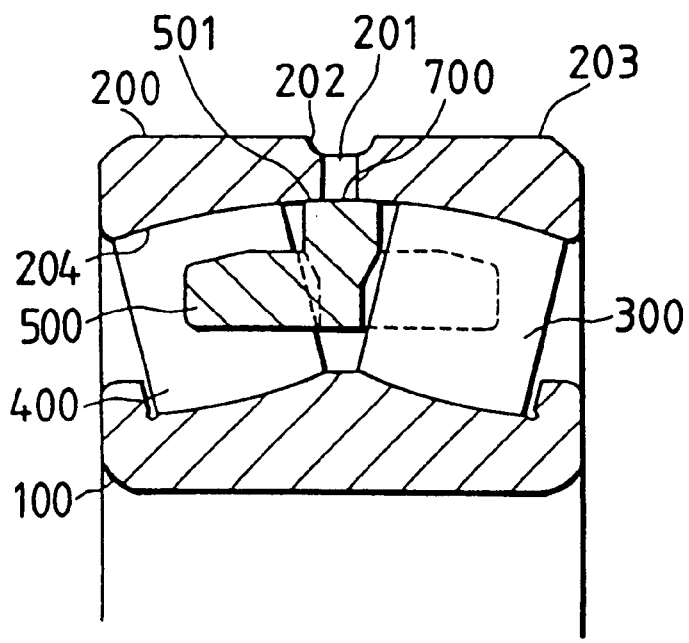
FIG. 7 is a longitudinal section view of a fourth example of the conventional self-aligning roller bearing.
Figure 8:
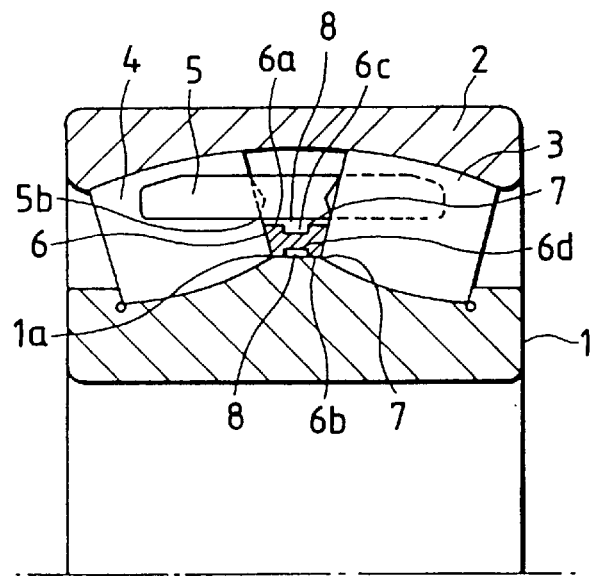
FIG. 8 is a longitudinal section view of a first embodiment of a self-aligning roller bearing according to the invention.
Figure 9:
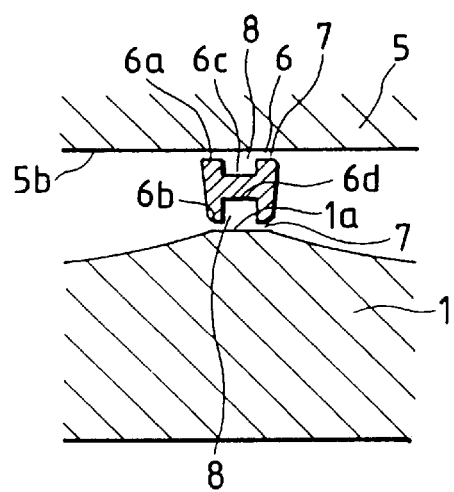
FIG. 9 is an enlarged section view of the main portions of the embodiment shown in FIG. 8.

Now, a self-aligning roller bearing according to the first embodiment of the invention shown in FIGS. 8 and 9 comprises an inner race 1, an outer race 2, two rollers 3 and 4, a cage 5, and a floating ring 6. In the present self-aligning roller bearing, between the inner peripheral surface 5b of the cage 5 and the outer peripheral surface 6a of the floating ring 6 as well as between the inner peripheral surface 6b of the floating ring 6 and the outer peripheral surface 1a of the inner race 1, there are formed lubricant feed portions 8 and 8 which are used to feed the lubricant or lubrication oil in the circumferential direction of clearances 7 and 7 respectively existing between the above-mentioned components of the present self-aligning roller (see FIGS. 8 and 9).

The lubricant feed portions 8 and 8 according to the present embodiment are composed of circumferential grooves 6c and 6d which are respectively formed in a recessed manner in the inner peripheral surface 6b and outer peripheral surface 6a of the floating ring 6 in the respective circumferential directions thereof, while the present lubricant feed portions 8 and 8 are respectively used to enhance the lubricating property of the present self-aligning roller bearing, in more particular, the lubricating conditions between the inner peripheral surface 5b of the cage 5 and the outer peripheral surface 6a of the floating ring 6 as well as between the inner peripheral surface 6b the floating ring 6 and the outer diameter 1a of the inner race 1.

That is, according to the first embodiment of the invention, the lubricant or lubrication oil gathers in the lubricant feed portions 8 and 8 respectively composed of the circumferential grooves 6c and 6d formed in the above-mentioned manner and is easy to move in the circumferential direction of the sliding surfaces of the cage inner peripheral surface 5b and floating ring outer peripheral surface 6a as well as in the circumferential direction of the sliding surfaces of the floating ring inner peripheral surface 6b and inner race outer peripheral surface 1a, which makes it possible to enhance the lubricating condition of the sliding surfaces of the present roller bearing and also to prevent the sliding surfaces against damage such as scraping and the like.

Now, a second embodiment shown in FIG. 10 comprises a single lubricant feed portion 8 existing only between the inner peripheral surface 6b of the floating ring 6 and the outer peripheral surface 1a of the inner race 1, while the lubricant feed portion 8 is composed of a circumferential groove 6d which is recessedly formed in the inner peripheral surface 6b of the floating ring 6.

In addition, a third embodiment shown in FIG. 11 comprises a single lubricant feed portion 8 existing only between the outer peripheral surface 6a of the floating ring 6 and the inner peripheral surface 5b of the cage 5, while the lubricant feed portion 8 is composed of a circumferential groove 6c which is recessedly formed in the outer peripheral surface 6a of the floating ring 6.

Further, a fourth embodiment shown in FIG. 12 comprises a single lubricant feed portion 8 existing only between the inner peripheral surface 6b of the floating ring 6 and the outer peripheral surface 1a of the inner race 1, while the lubricant feed portion 8 is composed of a circumferential groove 1c which is recessedly formed in the outer peripheral surface 1a of the inner race 1.

Furthermore, a fifth embodiment shown in FIG. 13 comprises a single lubricant feed portion 8 existing only between the inner peripheral surface 6b of the floating ring 6 and the outer peripheral surface 1a of the inner race 1; and, in the present embodiment, the lubricant feed portion 8 is composed of two circumferential grooves 6d and 1c which are recessedly formed respectively in the inner peripheral surface 6b of the floating ring 6 and in the outer peripheral surface 1a of the inner race 1.

Even when the present invention is enforced according to the second to fifth embodiments respectively structured in the above-mentioned manner, there can be provided a similar effect to the previously described first embodiment.

By the way, although not shown, in the bearing structures respectively illustrated in the second to fifth embodiments, it also falls within the scope of the invention to form a circumferential groove in the inner diameter 5b of the cage 5; that is, with use of this structure, there can also be obtained a similar effect to the previously described first embodiment.

Now, a sixth embodiment shown in FIGS. 14 and 15 comprises an inner race 1, an outer race 2, two rollers 3 and 4, a cage 5, and a floating ring 6, while the inner race 1 includes one or more radially extending through holes (lubrication oil holes) in communication with a circumferential groove 6d recessedly formed in the floating ring inner peripheral surface 6b, a circumferential groove 1c recessedly formed in the inner race outer peripheral surface 1a, and a circumferential groove 1d recessedly formed in the inner race inner peripheral surface 1b.

Therefore, according to the sixth embodiment, a lubricant feed portion 8, which extends in the circumferential direction of the bearing, is composed of the circumferential groove 1c formed in the outer peripheral surface 1a of the inner race 1 and the circumferential groove 6d formed in the inner peripheral surface 6b of the floating ring 6, which can eliminate the possibility that the floating ring 6 can spread directly over the through holes (lubrication oil holes) 1e formed in the inner race 1.

With this structure, the lubricant or lubrication oil, which is supplied from a shaft through the through holes (lubrication oil holes) 1e formed in the inner race 1, can be guided easily and uniformly in the circumferential direction of the bearing by the lubricant feed portion 8 so that the lubricant is allowed to spread over the whole periphery of the inner race outside surface 1a and floating ring inside surface 6b, which enables the lubricant to be discharged from the clearances 7 existing over the whole periphery of the inner race outside surface 1a and floating ring inside surface 6b, and also can reduce the resistance of the lubricant when it is discharged, thereby being able to supply a sufficient amount of lubricant into the interior portion of the bearing with a low pressure.

Also, since the recess-like circumferential groove 6d is formed in the floating ring inner peripheral surface 6b, the floating ring 6 can be floated uniformly on the circumference of the inner race outer peripheral surface 1a, and also the lubricant pressure in the circumferential direction of the interior portion of the circumferential groove 6d can be set uniform, so that the clearances 7 can be maintained uniformly on the circumference of the floating ring inside surface 6b.

Due to the above operation, a sufficient amount of lubricant can be supplied to the interior portion of the bearing, which makes it possible to solve the problem that the bearing can be damaged due to lack of lubrication amount.

Now, according to a seventh embodiment shown in FIG. 16, an inner race 1 comprises two circumferential grooves 1c and 1d recessedly formed in the outer peripheral surface 1a and inner peripheral surface 1b thereof, and one or more radially extending through holes (lubrication oil holes) 1e, in communication with these two circumferential grooves 1c and 1d; and, a circumferentially extending lubricant feed portion 8 is defined by and between the circumferential groove 1c and a floating ring 6. Due to this structure, in the present embodiment as well, there is eliminated the possibility that the floating ring can spread directly over the through holes (lubrication oil holes) 1e formed in the inner race 1.

Now, in an eighth embodiment shown in FIG. 17, a lubricant feed portion 8 is composed of only a circumferential groove 6d formed on the inner peripheral surface 6b side of a floating ring 6 and is used to lubricate between the floating ring 6 and inner race 1. In the present embodiment, although the above-mentioned circumferential groove 1c, as used in the seventh embodiment shown in FIG. 16, is not formed in the outer peripheral surface 1a of the inner race 1, the present structure can also provide a similar operation effect to the previously described embodiment.

Figure 19:
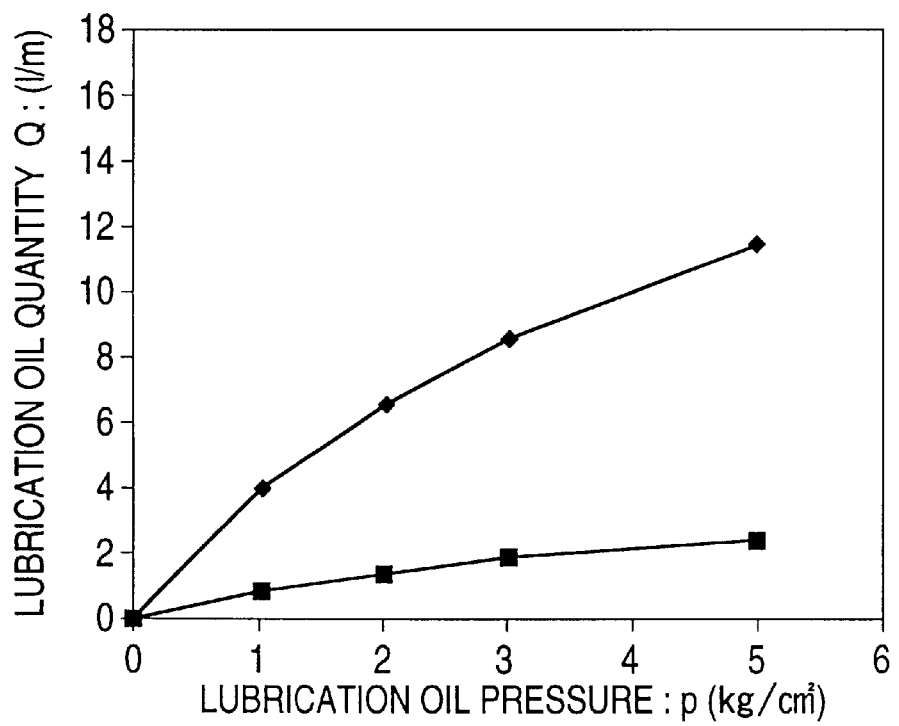
FIG. 19 is a graphical representation of the relationship between lubrication oil pressures and lubrication oil quantities, showing the difference between the ninth embodiment of the invention and the conventional bearing.

Also, in FIG. 19, there is shown the difference between the lubrication oil quantities and lubrication oil pressures, when the roller bearing according to the present embodiment (see FIG. 17) including the lubricant feed portion 8 composed of the circumferential groove 6d formed in the inner peripheral surface 6b of the floating ring 6 is compared with the conventional roller bearing excluding such lubricant feed portion.

From FIG. 19, it can be confirmed that, under the same lubrication oil supply pressure, the structure according to the present embodiment is able to obtain a lubrication oil supply quantity five times the lubrication oil supply quantity that is obtained in the conventional structure.

Now, according to a ninth embodiment shown in FIG. 18, there are provided a lubricant feed portion 8 consisting of a circumferential groove 6d which is recessedly formed in the inner peripheral surface 6b of a floating ring 6, and a plurality of axially extending grooves 6g which are respectively used to communicate the present circumferential groove 6d with the end face 6f of the floating ring 6, thereby being able to lubricate between the floating ring 6 and inner race 1. With use of this structure, the lubricant supplied to the lubricant feed portion 8 through the through holes 1e formed in the inner race 1 is guided in the circumferential direction of the floating ring 6 easily and uniformly through the lubricant feed portion 8 and is thereby allowed to spread over the whole periphery of the floating ring 6, and also the lubricant can be discharged from the respective axial grooves 6g, so that a quantity of supply of the lubricant can be increased and thus the lubricant property of the present roller bearing can be improved.

Now, according to a tenth embodiment shown in FIG. 20, in order to be able to enhance the lubricating property of the embodiment shown in FIG. 17 in which the lubricant is supplied between the floating ring 6 and inner race 1, that is, in order to be able to supply the lubricant between the inner peripheral surface 5b of the cage 5 and the outer peripheral surface 6a of the floating ring 6 as well, there are formed recess-like circumferential grooves 6c and 6d respectively in the outer and inner peripheral surfaces 6a and 6b of the floating ring 6, while these circumferential grooves 6c and 6d are respectively allowed to communicate with each other through the through holes 6e.

Therefore, since the plurality of radially extending through holes 6e are formed on the circumference of the floating ring 6, the lubricant or lubrication oil, which is supplied from the through holes (lubrication oil holes) 1e of the inner race 1 to the circumferential groove 6d of the floating ring inner peripheral surface 6b, is transferred through the radially extending through holes 6e to the circumferential groove 6c of the floating ring outer peripheral surface 6a, is then fed in the circumferential direction of the floating ring 6 by the circumferential groove 6c, and is finally infused into the interior portion of the present roller bearing. Also, according to the present embodiment, it is also possible to form a circumferential groove 1c in an recessed manner in the outer peripheral surface 1a of the inner race 1.

As shown in FIG. 21 (which shows an eleventh embodiment of the invention), there can also be employed a structure in which no circumferential groove 6d, as used in the tenth embodiment shown in FIG. 16, is formed in the inner peripheral surface 6b of the floating ring 6; that is, even with use of this structure, there can be obtained the same effect. Also, in the present or eleventh embodiment, it is also possible to form a circumferential groove 1c in a recessed manner in the outer peripheral surface 1a of the inner race 1.

Therefore, with use of the structures respectively shown in FIGS. 20 and 21, the lubrication condition between the floating ring inner peripheral surface 6b and the inner race outer peripheral surface 1a can be improved, and also the lubrication condition between the cage inner peripheral surface 5b and the floating ring outer peripheral surface 6 can be improved, thereby being able to solve the problem that the bearing can be damaged, for example, scraped and so on.

According to a twelfth embodiment shown in FIG. 22, an outer race 2 including a circumferential groove 2c formed in the outside surface 2a thereof and also a plurality of through holes 2e respectively formed along the circumference thereof to communicate the circumferential groove 2c with a raceway surface (inner peripheral surface) 2b thereof, an inner race 1, rollers 3, 4, a cage 5, and a floating ring 6 cooperate together in forming a self-aligning roller bearing;

and, in the thus formed self-aligning roller bearing, a lubricant feed portion 8 is composed of a circumferential groove 6c which is formed in the outer peripheral surface 6a of the floating ring 6. Therefore, the lubricant supplied to the circumferential groove 2c of the outer race outer peripheral surface 2a is sent through the through holes 2e to the lubricant feed portion 8, is then fed in the circumferential direction of the floating ring 6 through the lubricant feed portion 8, and is finally injected into the interior portion of the present roller bearing from the whole area of clearances respectively existing in the circumference of the floating ring 6.

According to a thirteenth embodiment shown in FIG. 24, an outer race 2 includes a circumferential groove 2c formed in the outside surface 2a thereof and also a plurality of through holes 2e respectively formed along the circumference thereof for communicating the circumferential groove 2c with a raceway surface 2b thereof, an inner race 1, rollers 3, 4, and a cage 5 cooperate together in forming a self-aligning roller bearing; and, in this roller bearing, a lubricant feed portion 8 is composed of a circumferential groove 5c which is formed in the outer peripheral surface 5a of the cage 5. In this structure as well, there can be provided a similar effect to the embodiment shown in FIG. 22.

Accordingly, with use of any one of the above-mentioned structures respectively shown in FIGS. 22 and 24, the lubricating condition between the floating outer peripheral surface 6a and the outer race inner peripheral surface 2b can be improved, or the lubricating condition between the cage outer peripheral surface 5a and the outer race inner peripheral surface 2b can be improved, thereby being able to prevent the bearing against damage such as scraping and the like due to lack of lubrication.

Figure 23A:
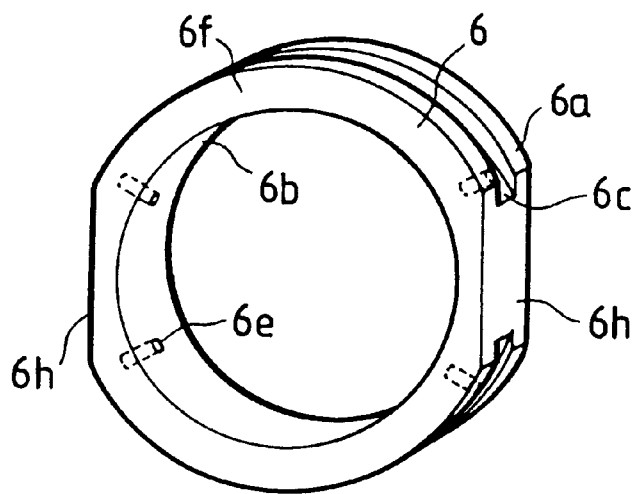
FIG. 23(a) is a perspective view of an embodiment of a floating ring employed in the invention; and, FIG. 23(b) is a longitudinal section view of an embodiment of an outer race employed in the invention.

Now, FIG. 23(a) shows an embodiment of a floating ring 6 employed in the invention, in which there are formed a plurality of through holes 6e used to communicate the inner peripheral surface 6b of the floating ring 6 with a circumferential groove 6c formed in the outer peripheral surface 6a of the floating ring 6. In FIG. 23(a), reference character 6h designates a flat surface.

Figure 23B:
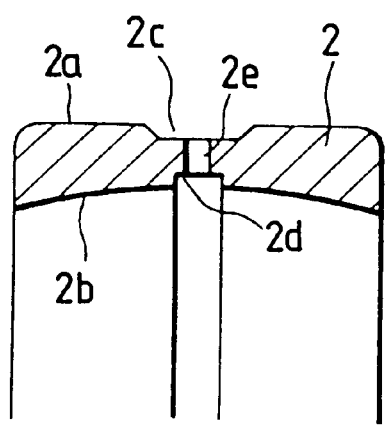

Also, the outer race 2 can also be structured such that it includes a circumferential groove 2d formed in the inner peripheral surface (raceway surface) 2b thereof and, with use of this structure, of course, there can be provided a similar effect to the above; that is, the present structure also falls within the scope of the present invention (see FIG. 23(b)).

Referring here to the circumferential groove 6d formed in the floating ring inner peripheral surface 6b, circumferential groove 6c formed in the floating ring outer peripheral surface 6a, circumferential groove 1c formed in the inner race outer peripheral surface 1a, axial grooves 6g used to communicate the floating ring end face 6f with the circumferential groove 6c formed in the inner peripheral surface 6b of the floating ring 6, through holes 1e used to communicate the inner peripheral surface 1b of the inner race 1 with the outer peripheral surface 1a thereof, through holes 6e used to communicate the inner peripheral surface 6b of the floating ring 6 with the outside surface 6a thereof, circumferential groove 2c formed in the outer race inner peripheral surface 2b, and circumferential groove 5c formed in the outer peripheral surface 5a of the cage 5, the widths or depths of these respective grooves or the diameters of these respective holes are not limited to the above-mentioned embodiments but they can be selected arbitrarily without departing from the scope of the present invention.

As has been described heretofore in detail, according to the invention, since the lubricant feed portion is structured in the above-mentioned manner, the lubricant can be spread easily and uniformly over the whole periphery of one or more of clearances respectively provided between the floating ring outer diameter and cage inner peripheral surface, between the outer race raceway surface and floating ring outer peripheral surface, and between the outer race raceway surface and cage outer peripheral surface, the lubricant can be discharged from the whole periphery of one or more of the clearances, the resistance of the lubricant when it is discharged can be reduced, and a sufficient quantity of lubricant can be supplied into the interior portion of the present roller bearing with a low pressure, thereby being able to prevent the present roller bearing against damage due to lack of lubrication oil quantity.

What is claimed is:

1. A self-aligning roller bearing including an inner race (1), an outer race (2), a roller (3), and at least one of a cage (5) and a floating ring (6), wherein said self-aligning roller bearing comprises at least one of a first clearance (7) between said cage (5) and said floating ring (6);

a second clearance (7) between said floating ring (6) and said inner race (1);

a third clearance (7) between said floating ring (6) and said outer race (2); and a fourth clearance (7) between said cage (5) and said outer race (2);

wherein at least one lubricant feed portion (8), in the form of a recess-shape, for feeding lubricant in the circumferential direction of said bearing is provided at said at least one of said first to fourth clearance, and wherein said at least one of said first to fourth clearance, at which said lubricant feed portion (8) is provided, is a small clearance (7) dimensioned for spreading lubricant in an axial direction over the periphery of the respective surfaces defining the clearance so that the lubricant is spread in the form of an annular shape.

2. The self-aligning roller bearing according to claim 1, in which said at least one lubricant feed portion (8) is shaped in the form of a circumferential groove.

3. The self-aligning roller bearing according to claim 1, in which at least one of said inner race, said outer race, said cage and said floating ring comprises a through hole (1e, 2e, 6e) extending in the radial directions thereof and communicating with said at least one of said first to fourth clearance.

4. A self-aligning roller bearing comprising:

an inner race (1), an outer race (2), a roller (3), a cage (5), and a floating ring (6);

a first clearance (7) between said cage (5) and said floating ring (6);

a second clearance (7) between said floating ring (6) and said inner race (1);

a third clearance (7) between said cage (5) and said outer race (2); and at least one lubricant feed portion (8), in the form of a recess-shape, for feeding lubricant in the circumferential direction of said bearing, wherein said at least one lubricant feed portion (8) is provided at least at one of said first to third clearances.

* * * * *